United States Patent [19]

Cholet et al.

[11] Patent Number: 5,562,433

[45] Date of Patent: Oct. 8, 1996

[54] PUMPING SYSTEM COMPRISING A HIGH-CAPACITY POSITIVE-DISPLACEMENT PUMP

[75] Inventors: Henri Cholet, Le Pecq; Hervé Petit, Rueil Malmaison, both of France

[73] Assignee: Institut Francais Du Petrole, Rueil-Malmaison, France

[21] Appl. No.: 357,926

[22] Filed: Dec. 16, 1994

[30] Foreign Application Priority Data

Dec. 16, 1993 [FR] France ................... 93 15854

[51] Int. Cl.⁶ .................. F04C 2/00; F04C 5/00; F04C 15/00
[52] U.S. Cl. .................. 418/47; 418/48; 418/102
[58] Field of Search .................. 418/47, 48, 102

[56] References Cited

U.S. PATENT DOCUMENTS

| | | | |
|---|---|---|---|
| 1,917,821 | 7/1933 | Branstrator | 418/102 |
| 2,255,918 | 9/1941 | Downs | 417/91 |
| 2,267,459 | 12/1941 | Hait | 418/48 |
| 2,463,341 | 3/1949 | Wade | 418/47 |
| 3,677,665 | 7/1972 | Corkill | 418/48 |
| 3,753,628 | 8/1973 | Becker | 418/48 |
| 3,802,803 | 4/1974 | Bogdanov et al. | 418/48 |

FOREIGN PATENT DOCUMENTS

| | | | |
|---|---|---|---|
| 2656652 | 5/1991 | France . | |
| 1580053 | 7/1990 | U.S.S.R. | 418/48 |

*Primary Examiner*—John J. Vrablik
*Attorney, Agent, or Firm*—Millen, White, Zelano & Branigan, P.C.

[57] ABSTRACT

The present invention relates to a system for pumping an effluent produced by a geologic formation at the bottom of a well, comprising a pump located in the well and rods connecting the pump to the surface. The pump includes at least a stator and a rotor. The rods are rotated by surface means driving the rotor into rotation to pump the fluid and to drive the fluid towards the surface through an annular pipe external to the rods. The system includes a mechanism for holding the rotor in the stator and for transmitting the rotation of the rods to the rotor. The pump includes means suited for allowing injection, from discharge area (26), of at least part of the effluent produced into the mechanism so as to ensure the lubrication thereof.

15 Claims, 3 Drawing Sheets

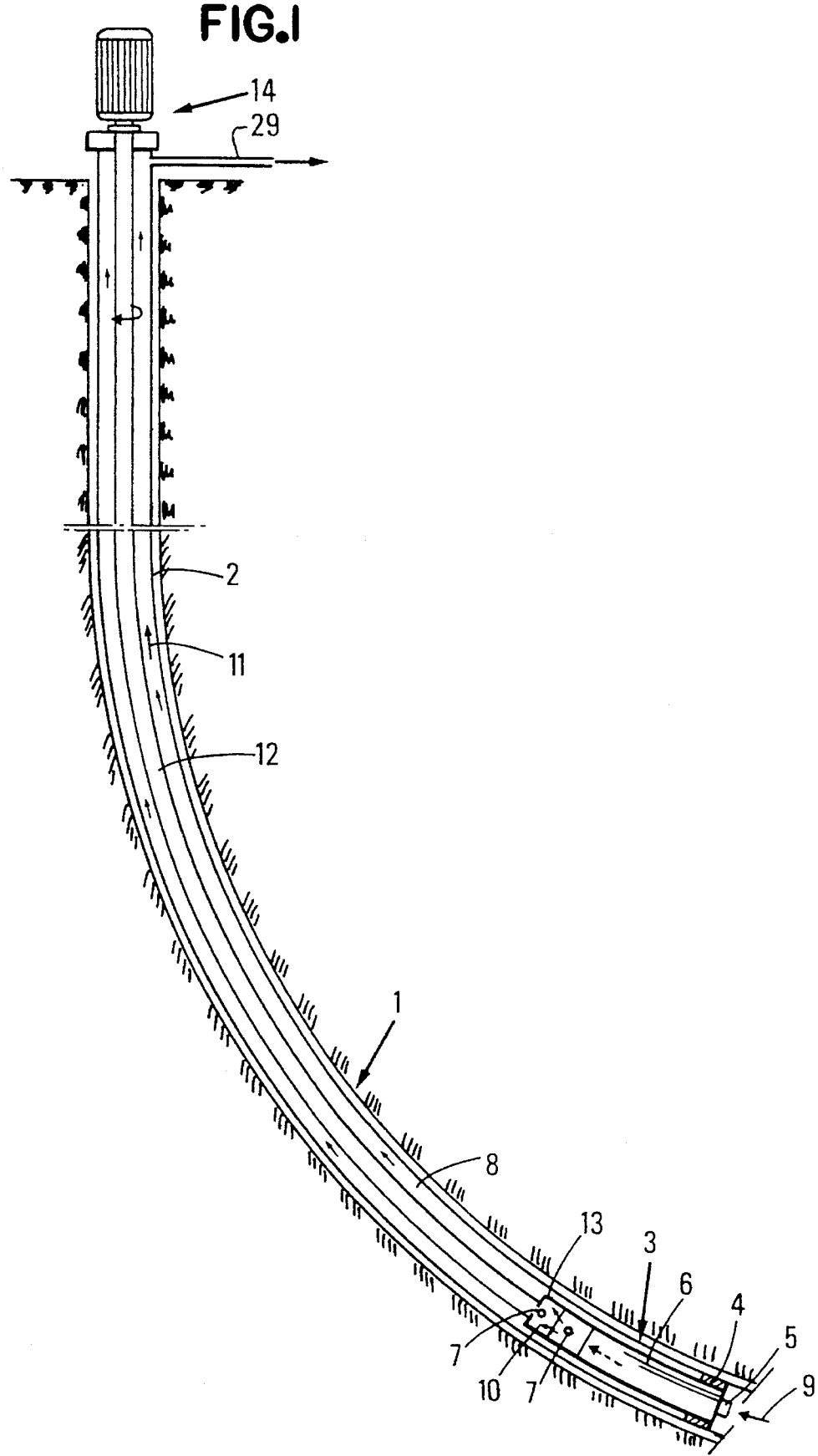

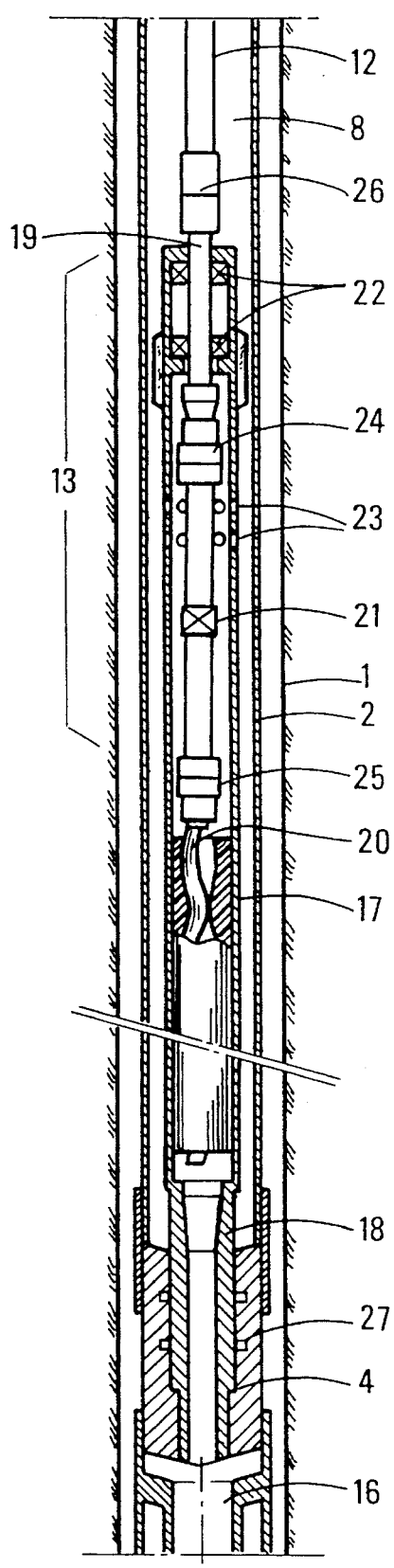
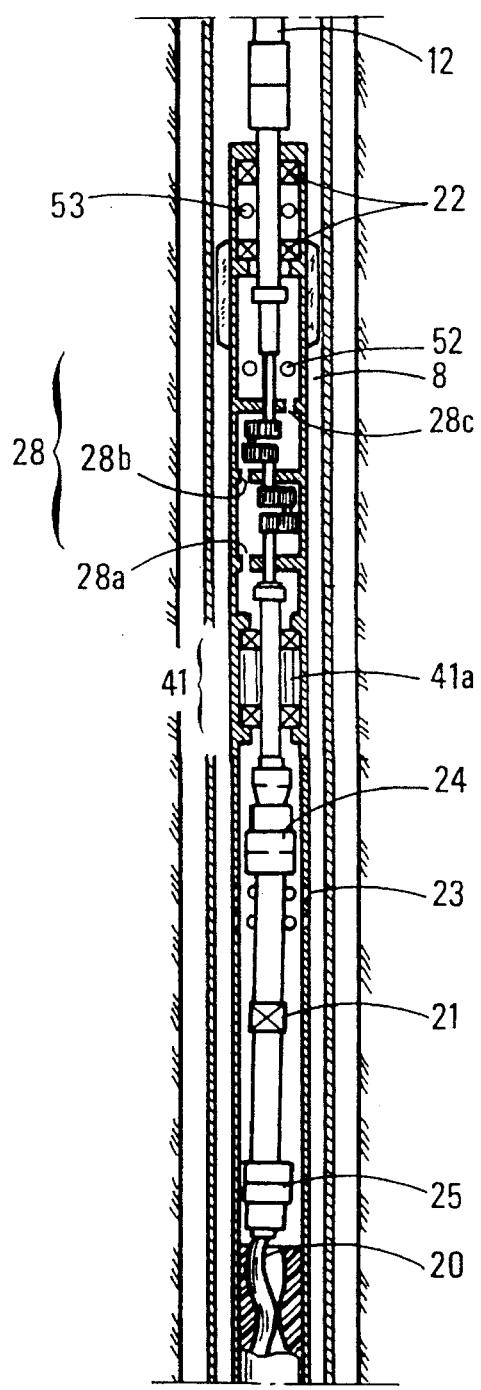
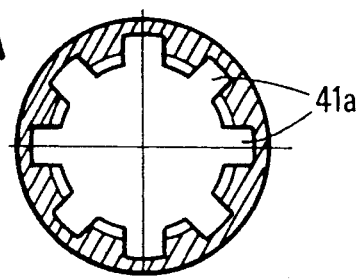

PUMPING SYSTEM COMPRISING A HIGH-CAPACITY POSITIVE-DISPLACEMENT PUMP

FIELD OF THE INVENTION

The present invention relates to a system for pumping an effluent produced by a geologic formation at the bottom of a well equipped with a tubular string. It includes a rotary positive-displacement pump suited for high rates of delivery of said effluent.

BACKGROUND OF THE INVENTION

It is well-known to use MOINEAU type pumps driven into rotation by rods which are themselves driven into rotation from a surface installation. However, the rotary speed of the pump rotor is limited notably by the mechanical strength of the rods, the dynamic frictions inside the well, or the mechanical mounting of the rotor in the pump stator. In fact, concerning the latter limitation, the nature of the effluents in which the pump is set, the pressure and the temperature prevailing at the bottom of a well complicate considerably the use of more efficient means for mounting the rotor in the stator. It is well-known that such mounting means require at least lubrication of the mechanical parts in motion. Under the conditions described above, tight and temperature-resisting mountings would thus be necessary to protect the fluid lubricating the mechanical means against pollution due to the effluent produced.

The present invention provides a solution to this technical problem by allowing the effluent itself to be used as a lubricating fluid, by circulating it through the mechanical mounting means driving the rotor.

Furthermore, according to a variant of the present invention, it is also possible to add to these mounting means a speed step-up gear for increasing the rotary speed of the rotor with respect to the rotary speed of the rods. A higher pumping capacity may thus be obtained with a reasonable rotary speed of the rods. It should be reminded that the capacity of a rotary positive-displacement pump is substantially proportional to the rotary speed of the rotor.

SUMMARY OF THE INVENTION

The present invention thus relates to a system for pumping an effluent produced by a geologic formation at the bottom of a well, comprising a pump located in the well and rods connecting the pump to the surface, the pump including at least a stator and a rotor, the rods driven into rotation by surface means driving the rotor into rotation so as to pump the effluent and to drive it towards the surface through an annular pipe external to said rods. The pumping system includes mechanical means for holding the rotor in the stator and for transmitting the rotation of the rods to the rotor. The pump includes means suited for allowing injection, from the discharge area, of at least part of the effluent produced into the mechanical means.

The mechanical means may include at least one element selected from a group comprising a flexible joint between said rods and said rotor, for example of the universal joint type, a speed step-up gear suited for allowing said rotor to be driven into rotation at a higher speed than the rotary speed of said rods, guide bearings for guiding the rotor with respect to the stator.

The pump stator may co-operate with seal means connected to a tubular string inside which the pump is located, the input and the discharge end of the pump may be located on either side of the seal means, the effluent discharged may flow up towards the surface through the annular space defined by the outside of the rods and the inside of the string.

The discharge area may include means for carrying off the effluent pumped upstream from the mechanical means.

The mechanical means may include outlet ports for the effluent portion used for lubricating them and the section of the outlet and exhaust ports may be determined to allow a predetermined proportion of the effluent produced to flow through the mechanical means.

The outlet ports may include a differential pressure limiter such as a weighed valve.

The means suited for allowing injection may include a particle filter.

The discharge area may include a cylindrical jacket and the means suited for allowing injection may include a draw-off port located substantially in the upper part of said jacket.

The present invention further relates to a method for lubricating at least one device for driving a bottomhole pump used for pumping a petroleum effluent. At least a portion of the effluent may be used to lubricate this device.

The portion may be drawn off after processing by a pumping cell of the pump.

Below a certain predetermined rate of flow or delivery pressure, the whole of the effluent processed by said pump may be used to lubricate said device.

The portion may be filtered prior to being used in the mechanical device.

The systems and the methods according to the present invention may be applied to the production of petroleum effluents.

BRIEF DESCRIPTION OF THE DRAWINGS

Other features and advantages of the system according to the invention will be clear from reading the description hereafter of embodiments given by way of non limitative examples, with reference to the accompanying drawings in which:

FIG. 1 diagrammatically shows a pumping system according to the invention,

FIG. 2 shows a positive-displacement pump equipped with mechanical means,

FIG. 3 shows a variant of the pumping system including a speed step-up gear,

FIG. 3A is a cross-section of the variant according to FIG. 3,

DESCRIPTION OF THE PREFERRED EMBODIMENTS

Figure 5:
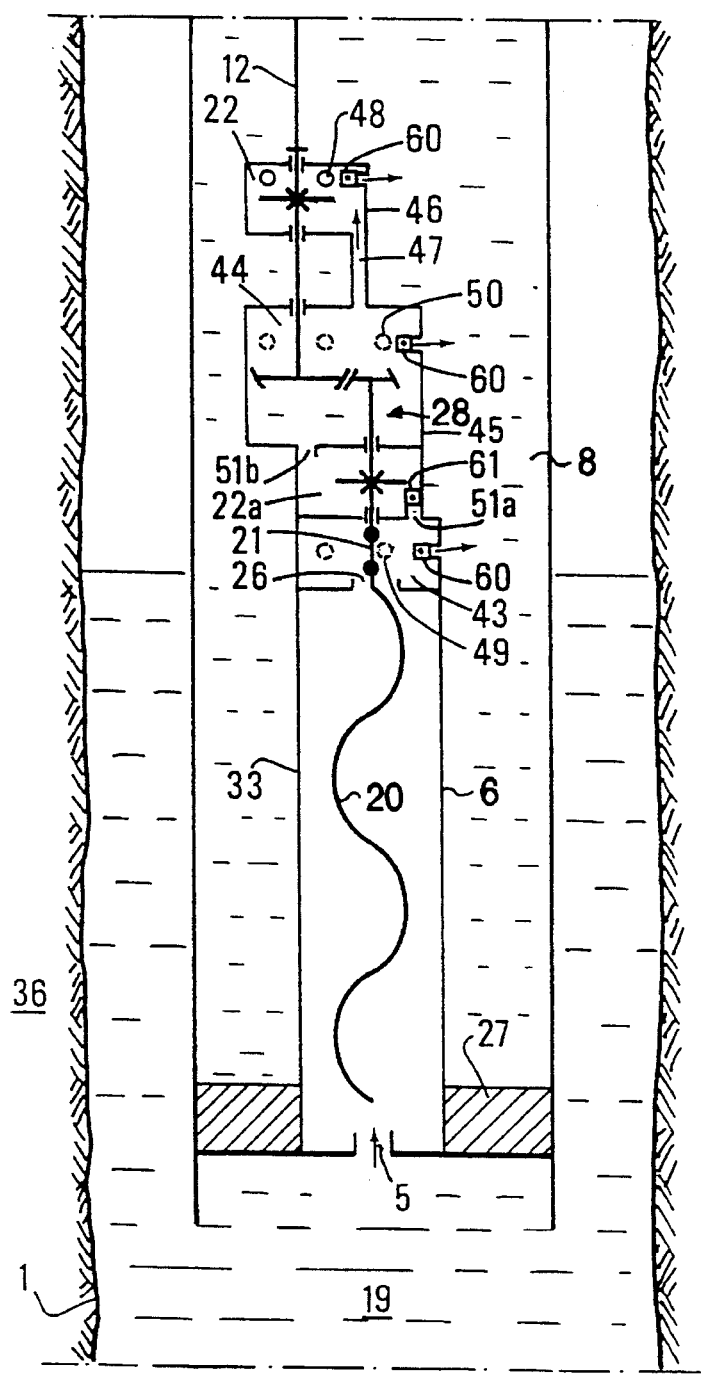

In FIG. 1, a well 1 reaches a geologic formation producing an effluent containing hydrocarbons. The pressure prevailing in the formation is too low for the effluent to be able to flow up to the surface. The producing formation is a non eruptive formation. The production scheme therefore requires implementation of a system for pumping the effluent.

What is called an effluent here is the whole of the fluids present in well 1.

Well 1 is equipped with a string 2 whose lower end dips in the effluent. The annular space defined between well 1 and the outside of string 2 may be sealed or not by a seal system of the packer type. The main purpose of string 2, generally called a "production string", is to direct the production from the bottom to the ground surface by means of its inner pipe.

A pumping system 3 is positioned in string 2 by means of a seat 4. In the case of a Moineau type pump, the purpose of seat 4 is at least to fasten longitudinally and in rotation the stator of pump 6, to provide a seal between the body of pump 6 and string 2. An opening 5 allows the effluent to pass into pump 6.

An opening 7 allows the effluent delivered by the pump to flow out into the inside 8 of string 2. Arrows 9, 10 and 11 show the path of the effluent.

The pumping system includes mechanical means 13 which will be described in detail in the present description hereafter by means of FIGS. 2 and 3.

A string of rods 12 is connected to mechanical means 13 by its lower end, the upper end located at the surface co-operates with rotation driving means 14 such as an electric motor.

Pumping system 3 is set on seat 4 through the assemblage of string of rods 12 in the inner space 8 of string 2, preferably after the latter has already been assembled. The system is taken up by a reverse operation.

Driving string of rods 12 into rotation causes the rotation of the rotor (not shown in this figure) of pump 6 through the co-operation of mechanical means 13.

FIG. 2 shows an embodiment of the pump of the pumping system according to the invention. String 2 includes a receptacle or seat 4 screwed above an effluent supply pipe 16, and device 16 may be a static liquid-gas separator, for example that described in patent FR-2,656,652. In case of the presence of free gas in the effluent, the annular space between string 2 and well 1 is used for directing the gas up to the surface.

A part 18 complementary to seat 4 is fastened to the end of the body 17 (stator) of the pump. Co-operation of part 18 and of seat 4:

fastens body 17 (stator) in rotation with respect to string 2, fastens the pump longitudinally in string 2 (a reversible locking means may be added), insulates, by seal means 27, the annular space 8 used for discharge from the effluent inflow area.

The body of pump stator 17 includes, in its upper part, mechanical means 13 fulfilling at least the following functions:

guidance in rotation and longitudinal fastening by bearings 22, transmission of the rotation of rods 12 to the pump rotor 20 by couplings 24 and 25, flexible link 21, for example a universal type joint, when the rotor of the pump type used moves, in addition to rotation, according to a radial nutation displacement.

According to the embodiment of FIG. 2, the body of pump stator 17 includes, substantially in the upper part thereof, exhaust ports 23 for carrying off the effluent delivered by the pump. These ports 23 communicate with annular space 8.

Mechanical beatings 22 are not sealed, which allows the fluid produced to circulate through bearings 22 consisting preferably of ball or roller beatings, achieving thereby splash lubrication and/or cooling of the parts in motion. The housing of the beatings may include outlet ports for the fluid produced.

The pump type may be of any rotary positive-displacement type. The pump is preferably a Moineau type pump in view of the industrial field concerned.

FIG. 3 illustrates another variant according to the invention, where a speed step-up gear 28 is inserted between coupling 24 and beatings 22.

The design of this speed step-up gear being understandable to the man skilled in the art knowing about mechanics, it will not be detailed in the present description. The speed increase coefficient preferably ranges between 1 and 5.

In this embodiment, the speed step-up gear 28 is crossed by part of the fluid pumped by the pump.

In fact, if part of the pumped fluid is discharged through ports 23, the rest thereof flows out through ports 52 and 53 located beyond variable-speed drive 44 in the direction of flow.

The surface installation may include a beating system and a lateral outlet 29 allowing the effluent pumped by said system to be collected.

The bearing system may be screwed on the end of string 2. This bearing system receives a shaft mobile in rotation on which the upper rod 12 is assembled. Roller thrum may be provided in the mechanical mounting of the shaft in the beating system. This shaft 12 may be driven into rotation by any well-known means conventionally used on well sites.

The layout of FIG. 3 includes another array of thrust beatings referenced 41 and located between speed step-up gear 28 and coupling 24.

The fluid produced by the pump flows through and lubricates bearings 41 for example through an array of channels 41a provided in the walls of the housing of these bearings (FIG. 3A), then flows through passages 28a, 28b and 28c and lubricates speed step-up gear 28, and finally reaches bearings 22 which are also lubricated thereby.

Figure 4:
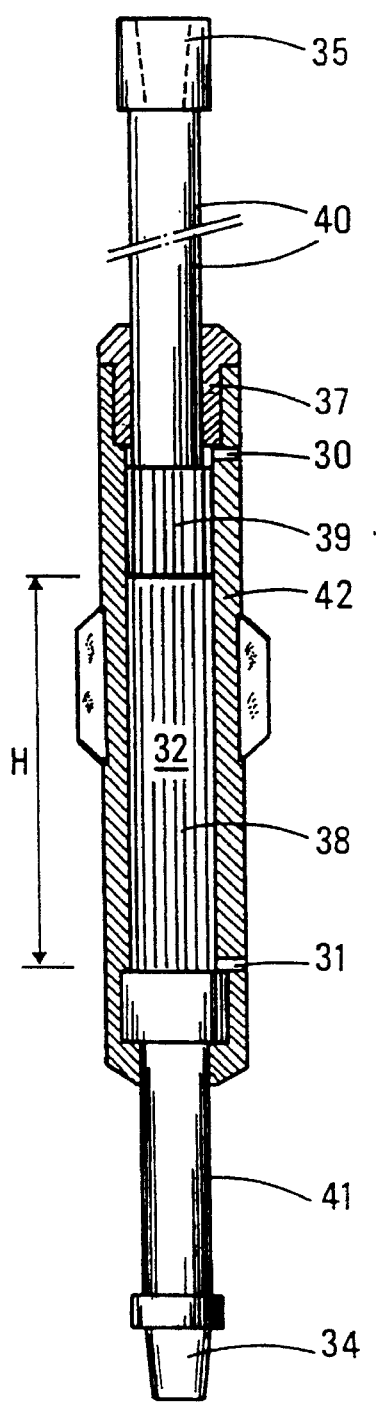
FIG. 4 shows an embodiment of a slide intended for being integrated to the rods, and FIG. 5 diagrammatically shows various embodiments of the present invention.

FIG. 4 illustrates a slide for adjusting the length of the string of rods 12. In fact, bottomhole conditions may cause variation of the length of the string of rods between the pump and the surface installation. The string being in rotation to actuate pumping, it is recommended that the rods undergo no buckling. One or several collapsible elements are therefore preferably added to the string of rods in order to allow lengthening or shortening thereof without developping any substantial axial stress.

To that effect, the slide is inserted between two rods 12 by means of connections 35 and 34. The slide shown in the example includes a body 42 on which a shaft 41 is immovably assembled. Longitudinal grooves 38 are machined in the inner bore of body 42. A shaft 40 including keys 39 is mourned in body 42. Keys 39 and grooves 38 have complementary shapes so that shaft 40 may slide longitudinally in body 42 over the whole of stroke H. The slide thus allows transmission of the rotation while leaving an end play corresponding to length H.

If clearances are insufficient between shaft 40 and beating 37 or between grooves 38 and keys 39, openings 30 and 31 may allow free fluid transfer between annulus 8 and the inner space 32 of the slide. Besides, this fluid may be used as a slide lubricating fluid.

FIG. 5 diagrammatically illustrates the device and the method according to the present invention.

Reference 1 refers to a well producing a fluid 19 and notably a petroleum effluent. Reference 36 designates the geologic formation.

The active part 33 of the pump has an inlet port 5 and an outlet port 26.

This outlet port is hydraulically connected to at least one mechanical device used for driving the pump. FIG. 5 shows three types of mechanical devices, a thrust casing 22, a variable-speed drive 44 for stepping up or down the speed and a flexible link 21.

Generally, these mechanical means are lubricated in a separate and sealed way. According to the present invention, the pump outlet port 26 is hydraulically connected to at least one of the mechanical devices used for driving the pump. The fluid processed by the pump may thus reach at least one mechanical device and lubricate it. According to a preferred embodiment of the present invention, the processed fluid is used for lubricating the mechanical devices and is continuously changed.

In FIG. 5, outlet port 26 opens into a chamber 43 containing flexible link 21. Ports 51a and 51b connect chamber 43 to the casing 45 of variable-speed drive 44 via a thrust beating system 22a. A line 47 connects casing 45 to a casing 46 containing another thrust bearing system.

According to a first embodiment, only the mechanical device casing or housing located at the furthest distance, considering the direction of flow of the fluid produced, includes exhaust ports.

In FIG. 5, thrust casing 46 includes exhaust ports 48. The effluent produced thus flows from chamber 43 towards the casing 45 of the variable-speed drive, then towards thrust casing 46 and finally flows off through ports 48 in the annular discharge area 8.

Of course, another circuit may be adopted without departing from the scope of the present invention, for example if a line connects chamber 43 directly to thrust casing 22 and only the casing 45 of the variable-Speed drive includes exhaust ports, one only of passages 51a or 51b being closed.

According to another implementation variant of the invention, chamber 43 includes exhaust ports 49 and casing 44 includes exhaust ports 50 shown in dotted line in FIG. 5. The size and the number of ports 48, 49 and 50 are so determined that the mechanical means to be lubricated: the thrust casing, the variable-speed drive and possibly the flexible mechanical link, receive at least a sufficient amount of fluids produced to fulfill the lubrication purpose.

Without departing from the scope of the present invention, the exhaust ports of chamber 43, casing 45 or casing 46 may include a weighed valve system 60.

For example, the ports 49 of chamber 43 may be preferably provided with such valves so that, as long as the flow of fluid produced by pump 33 remains below a predetermined flow threshold value, the production flows out through the ports of casings 46 and 45. When the flow exceeds this predetermined threshold value, the valves of ports 49 open and discharge part of the fluid produced towards area 8. Port 51a may include a particle filter 61.

The predetermined flow threshold value is intended to allow lubrication of the mechanical means.

Insofar as the body of pump 33 integrates chamber 43 and casings 46 and 45, line 47 is not necessary, and the whole of the mechanical devices will be included in a single housing, or openings will be provided in the walls delimiting the various mechanical elements. In summary, and as perhaps best seen in FIG. 5, a system is provided for pumping effluent 19 produced by geological formation 36 from a well 1 through a tubular string 2 having an outlet 29 at the top of the well. A screw pump 3 having a rotor 20 within a stator 6 pumps the effluent through an opening 5 at the bottom end of the pump into a generally annular space between the pump and the tubular string. A seal 27 radially projects to seal the annular space between the stator and the tubular string proximate the inlet 5.

The casing 43 forms a first chamber which has a coupling 21, such as a universal joint, connecting the rotor to an output shaft from the drive 44. The first chamber has a fluid inlet 26, at least one exhaust 49 to the tubular string space 8 and an outlet to a second chamber 22a. The second chamber 22a includes a bearing for stabilizing the output shaft and an outlet to a third chamber 44 which includes a speed changing drive 28. The third chamber 44 has an exhaust to the annular space 8 and an outlet to a fourth chamber 22. The fourth chamber 22 includes a bearing for stabilizing an input shaft to the speed changing drive and a final exhaust 48 to the annular space 8.

The input shaft is connected to one end of the series of rods 12, which series of rods 12 have at an opposite end thereof a connection to the drive motor 14. Each of the exhaust ports has a differential pressure limiter 60 so that when the pressure of the effluent is below a selected level, the effluent flows only from the exhaust of the third and fourth chambers 44 and 22 and when the flow exceeds the selected level, the flow occurs also through the exhaust 49 of the first chamber 43.

What is claimed is:

1. A system for pumping an effluent produced by a geologic formation at the bottom of a well, including a pump located in the well and series of rods connecting said pump to the surface, said rods extending through a tubular string and said pump being positioned in the string proximate the end thereof, said pump including at least a stator and a rotor, said rods brought into rotation by surface means driving said rotor into rotation in order to pump the effluent and to drive the effluent towards the surface through said tubular string, said system being characterized in that the stator (6) of the pump has an inlet proximate one end thereof and in that the stator is sealed by a Seal (4) proximate the end thereof with the tubular string (2), in that said pump (33) includes mechanical means (21; 22a; 44; 22) for holding said rotor (20) in said stator (6) and for transmitting the rotation of said rods (12) to said rotor (20), and in that said pump (33) includes means including a discharge chamber (26) downstream of the stator (6) and rotor (20) for discharging effluent into the string for transport to the surface, the discharged effluent flowing around the outside of the stator as the effluent flows to the surface; means for directing at least part of the effluent produced into and through said mechanical means so as to lubricate the mechanical means.

2. A system as claimed in claim 1, wherein the pump stator cooperates with seal means (27) connected to a tubular string inside which the pump is located, the input (5) and the discharge end (26) of the pump are located on either side of said seal means, and the effluent discharged flows up towards the surface through the annular space (8) defined by the outside of rods (12) and the inside of said string.

3. A system as claimed in claim 1, wherein said discharge area (26) includes exhaust means (49) for carrying off part of the effluent pumped upstream from said mechanical means.

4. A system as claimed in claim 1, wherein said means suited for allowing injection include a particle filter.

5. A system as claimed in claim 1, wherein said discharge area includes a cylindrical jacket and said means suited for allowing injection include a draw off port located substantially in the upper part of said jacket.

6. A system as claimed in claim 5, wherein said mechanical means include at least one device selected from a group consisting of a flexible joint (21) between said rods and said rotor, a speed step-up gear (44) for allowing said rotor to be driven at a higher speed than the rotary speed of said rods, and guide bearings (22a; 22) for guiding with respect to the stator.

7. A system as in claim 6, wherein said discharge area (26) includes exhaust means (49) for carrying off part of the effluent pump upstream from said mechanical means.

8. A system as in claim 7, wherein said mechanical means include outlet ports (21; 50; 48) for exhausting the effluent portion which has been used for lubricating them, and wherein the section of said outlet and exhaust ports is determined so as to allow a predetermined proportion of the effluent produced to pass through said mechanical means.

9. A system as claimed in claim 8, wherein said outlet ports include a differential pressure limiter in the form of a weighted valve.

10. A system as claimed in claim 9, wherein said means suited for allowing injection include a particle filter.

11. A system as claimed in claim 10, wherein said discharge area includes a cylindrical jacket and said means suited for allowing injection include a draw off port located substantially in the upper part of said jacket.

12. A system for pumping effluent produced by a geological formation from a well through a tubular string having an outlet at the top of the well, the system comprising:

a screw pump comprised of a rotor within a stator, the stator having an opening at a bottom end thereof and a seal radially projecting therefrom to seal with the interior surface of the tubular string;

a first chamber connected to the stator and including a coupling therein coupling the rotor to an output shaft, the first chamber having a fluid inlet through which the rotor projects into the first chamber, an exhaust to the tubular string and an outlet to a second chamber; the second chamber including a bearing for stabilizing the output shaft and having an outlet to a third chamber; the third chamber including a speed changing drive for connecting the output shaft to an input shaft and having an exhaust to the tubular string and an outlet to a fourth chamber, the fourth chamber including a bearing for stabilizing the input shaft and a final exhaust to the tubular string;

a series of rods connected end-to-end and extending in the tubular string, the series having one end connected to the input shaft of the speed changing drive and an opposite end connected to a drive motor at the top of the well; whereby portions of the effluent being pumped lubricates the coupling, bearings and drives within the chambers prior to entering the tubular string and flowing through the tubular string to the outlet thereof.

13. The system of claim 12 further including a particle filter disposed at the outlet connecting the first chamber to the second chamber.

14. The system of claim 13 further including at each exhaust port a differential pressure limiter, whereby when the pressure is below a selected level, the effluent flows only from the exhausts of the third and fourth chambers and when the flow exceeds the selected level, the flow occurs also through the exhaust of the first chamber.

15. The system of claim 12 further including at each exhaust port a differential pressure limiter, whereby when the pressure is below a selected level, the effluent flows only from the exhausts of the third and fourth chambers and when the flow exceeds the selected level, the flow occurs also through the exhaust of the first chamber.

* * * * *